(12) United States Patent
George et al.

(10) Patent No.: US 8,638,676 B2
(45) Date of Patent: Jan. 28, 2014

(54) METHODS AND SYSTEMS TO ALLOW MULTIPLE SIP APPLICATIONS ON A SIP CLIENT THE ABILITY TO SELECT SPECIFIC APPLICATIONS AND FEATURES ON A SIP SERVER

(75) Inventors: Richard George, Waterloo (CA); Dalsu Lee, Thornhill (CA)

(73) Assignee: Blackberry Limited, Waterloo, Ontario (CA)

( * ) Notice: Subject to any disclaimer, the term of this patent is extended or adjusted under 35 U.S.C. 154(b) by 2055 days.

(21) Appl. No.: 11/691,861

(22) Filed: Mar. 27, 2007

(65) Prior Publication Data

US 2008/0244709 A1   Oct. 2, 2008

(51) Int. Cl.
*H04L 1/00*   (2006.01)

(52) U.S. Cl.
USPC .......................................... 370/252; 709/228

(58) Field of Classification Search
USPC .......... 370/252, 351, 352, 392, 401; 709/203, 709/217–219, 227, 228, 230, 246
See application file for complete search history.

(56) References Cited

U.S. PATENT DOCUMENTS

| | | | |
|---|---|---|---|
| 6,963,635 B1 | 11/2005 | Jones | |
| 2005/0033684 A1* | 2/2005 | Benedyk et al. | 705/39 |
| 2005/0041648 A1* | 2/2005 | Bharatia et al. | 370/352 |
| 2006/0047840 A1* | 3/2006 | Postmus | 709/230 |
| 2006/0187931 A1* | 8/2006 | Hwang | 370/392 |
| 2006/0218314 A1* | 9/2006 | Kawabe | 710/33 |
| 2006/0236091 A1* | 10/2006 | Kaji et al. | 713/150 |
| 2007/0038723 A1 | 2/2007 | Gourraud | |
| 2007/0156909 A1* | 7/2007 | Osborn et al. | 709/227 |

FOREIGN PATENT DOCUMENTS

| | | |
|---|---|---|
| CN | 1662004 A | 8/2005 |
| EP | 1 753 199 | 2/2007 |
| FR | 2 873 881 | 2/2006 |

OTHER PUBLICATIONS

Office Action for corresponding Canadian Patent Application No. 2,626,353 issued on Jun. 10, 2011, 2 pages.
Java™ Micro Edition, "IP Multimedia Subsystem (IMSs) Services API", *Early Draft version 0.5*, Jan. 2006, Cover page, Table of Contents and pp. 18-22.
Avaya Solution & Interoperability Test Lab, "Configuring SIP Call Routing among Avaya Converged Communications Server and Cisco SIP Telephony Network Devices—Issue 1.0", Solution & Interoperability Test Lab Application Notes, Nov. 28, 2004, 28 pages.
Chinese Office Action for corresponding Chinese Patent Application No. 2008101258710, Mar. 2, 2011, 5 pages.
English-language translation of Chinese Office Action for corresponding Chinese Patent Application No. 2008101258710, Mar. 2, 2011, 8 pages.

* cited by examiner

*Primary Examiner* — Hassan Phillips
*Assistant Examiner* — Ajay Cattungal

(57) ABSTRACT

A method is provided for a SIP client to select a SIP application and a SIP feature associated with the SIP application by sending a message to a remote SIP server that includes the identification of the SIP application and SIP feature. The message may be generated by the SIP client using SIP application configuration information stored on the SIP client. The SIP application configuration information includes information about SIP applications and associated features and where the SIP applications can be located. A further method is provided for a SIP enabled device, for example a SIP client or a SIP server, to be provided with SIP application configuration information by a configuration server. Various SIP enabled devices and a configuration server for implementing the methods are also described herein.

27 Claims, 7 Drawing Sheets

METHODS AND SYSTEMS TO ALLOW MULTIPLE SIP APPLICATIONS ON A SIP CLIENT THE ABILITY TO SELECT SPECIFIC APPLICATIONS AND FEATURES ON A SIP SERVER

FIELD OF THE APPLICATION

The application relates to the use of multiple SIP applications and configuring devices having multiple SIP applications.

BACKGROUND

Session Initiation Protocol (SIP) is a protocol that allows a client to initiate, control and release a media session via a controlling server. It is possible for signalling using SIP to contain the media of the media session, for example instant messaging and presence information (information conveying a user's willingness and ability to engage in communications). However, more often, the media flows over a separate connection between a media server and the client, using for example Real-time Transport Protocol (RTP). There is no requirement for the media server and the SIP server to be physically located on the same hardware platform.

The SIP client includes a SIP client application that communicates with a SIP server application on the SIP server located elsewhere on a network. Each SIP server application is uniquely addressable through a combination of IP address and port to enable the SIP client application to contact the SIP server application.

Currently, SIP hardware endpoints are mainly designed to work with only a single application. A particular example is a VoIP (Voice over Internet Protocol) handset interacting with a VoIP PBX application.

SIP applications on SIP endpoints are assumed to be self-configuring, that is, there is no central authority to control what applications are loaded onto a SIP endpoint. Thus a SIP application may be loaded onto any SIP endpoint and executed as long as the application can spoof the application registration.

A SIP application may include multiple features. For example, in the case of the VoIP PBX application, features of the VoIP PBX application may include call park, call transfer, call waiting, voice mail, Do Not Disturb, etc.

There is no standard way that a particular SIP endpoint supporting multiple applications may have a subset of applications enabled, nor for an individual application to have a subset of features enabled.

As SIP has evolved the SIP hardware endpoints are being allowed more functionality and SIP servers are being designed to offer multiple applications.

BRIEF DESCRIPTION OF THE DRAWINGS

Embodiments will now be described with reference to the attached drawings in which.

DETAILED DESCRIPTION OF THE EMBODIMENTS

Figure 1:
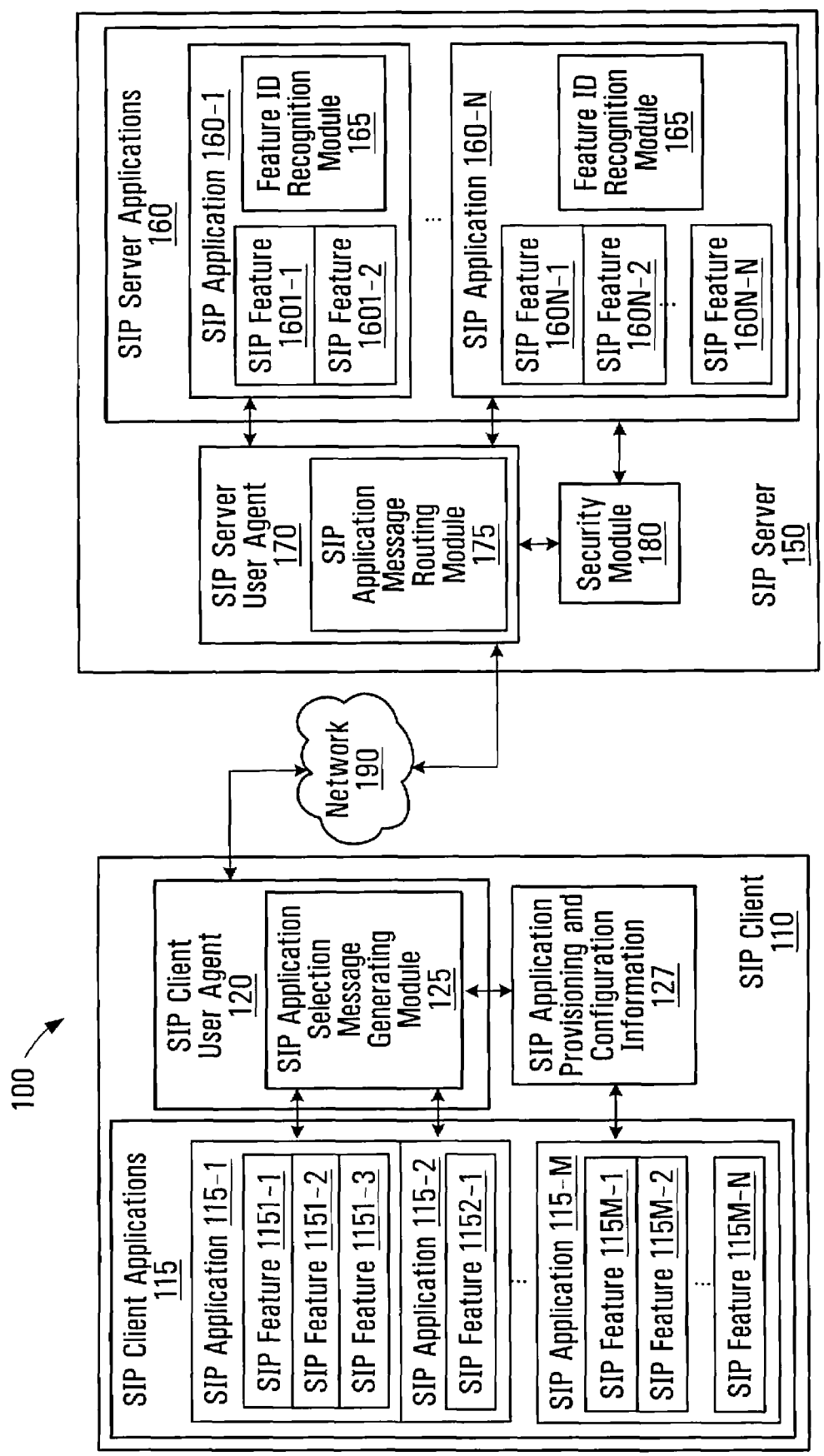
FIG. 1 is a block diagram of a session initiation protocol (SIP) client and a SIP server communicating according to an embodiment of the application.

According to a first aspect, there is provided a method comprising: a SIP application on a SIP client that supports multiple SIP applications requesting selection of a SIP application and a SIP feature from a SIP server comprising at least one SIP application, the at least one SIP application comprising at least one SIP feature; determining if the requested SIP application and SIP feature are authorized to operate on the SIP client; if the requested SIP application and SIP feature are authorized to operate on the SIP client, generating a message comprising a destination address of the SIP server, a source address of the SIP client, a SIP application identifier (ID) for the requested SIP application and a SIP feature identifier (ID) for the requested SIP feature; the SIP client transmitting the message.

According to a second aspect, there is provided a method for routing a request for a session initiation protocol (SIP) application and a SIP feature associated with the SIP application, the method comprising: a SIP server receiving a message comprising a destination address of the SIP server, a source address of a SIP client which sent the message, a SIP application identifier (ID) associated with the requested SIP application and a SIP feature identifier (ID) associated with the requested SIP feature; the SIP server forwarding the message to the SIP application identified by the SIP application ID; the SIP application identified by the SIP application ID receiving the message and forwarding the message to the SIP feature identified by the SIP feature ID.

In some embodiments, a SIP server receiving a message comprises receiving one of: an INVITE message to start a SIP session between a SIP application of a different SIP enabled device and the SIP application identified by the SIP application ID; and a NOTIFY message to close out a SIP session between the SIP application of the different SIP enabled device and the SIP application identified by the SIP application ID.

In some embodiments, a SIP server receiving a message further comprises receiving an indication to securely identify the SIP client and to allow authorized access to applications and features on the SIP server, wherein the indication includes one of: a user identification and a password; and a shared key or certificate.

According to a third aspect, there is provided a method for providing a session initiation protocol (SIP) enabled device with SIP application configuration information, the method comprising: the SIP enabled device receiving SIP application configuration information for at least one SIP application, the SIP configuration application information for each SIP application comprising a SIP application identifier (ID) and a list of SIP features associated with the SIP application, each SIP feature of the list of SIP features having a SIP feature identifier (ID); the SIP enabled device storing the SIP application configuration information locally.

In some embodiments, receiving SIP application location information for a SIP server hosting the SIP application comprises receiving a destination address and a port number for the SIP application on the SIP server hosting the SIP application.

In some embodiments, the method further comprises the SIP enabled device transmitting a request for SIP application configuration information.

According to a fourth aspect, there is provided a method for configuring a session initiation protocol (SIP) enabled device comprising: a configuration server transmitting SIP application configuration information for at least one SIP application, the SIP application configuration information for each SIP application comprising a SIP application identifier (ID) and a list of SIP features associated with the SIP application, each SIP feature of the plurality of SIP features having a SIP feature identifier (ID).

According to a fifth aspect, there is provided a session initiation protocol (SIP) client comprising: at least one SIP application operable to request a SIP user agent of the SIP client select a SIP application and a SIP feature associated with the SIP application on a SIP server, the SIP application having a SIP application identifier (ID) and the SIP feature having a SIP feature identifier (ID); the SIP user agent operable to: generate a message, the message comprising a destination address of the SIP server, a source address of the SIP client, the SIP application ID and the SIP feature ID; output the message for transmission by the SIP client.

In some embodiments, the message is generated based on SIP application configuration information.

According to a sixth aspect, there is provided a session initiation protocol (SIP) server comprising: a SIP user agent operable to: receive a message comprising a destination address of the SIP server, a source address of a SIP client that sent the message, a SIP application identifier (ID) for a SIP application selected by the SIP client and a SIP feature identifier (ID) for a SIP feature selected by the SIP client; forward the message to a SIP application identified by the SIP application ID in the received message; at least one SIP application, each SIP application having: at least one associated SIP feature, wherein each SIP application has a SIP application ID and each SIP feature having a SIP feature ID; and a feature ID recognizing module operable to recognize a SIP feature ID and forward the message to a SIP feature of the at least one associated SIP feature identified by the SIP feature ID in the received message.

According to a seventh aspect, there is provided an apparatus for providing session initiation protocol (SIP) application configuration information comprising: processing logic operable to: determine SIP application configuration information specific to a SIP enabled device; access a computer readable memory comprising SIP application configuration information for a plurality of SIP applications; select SIP application configuration information specific to the SIP enabled device to provide to the SIP enabled device; a computer readable memory for storing SIP application configuration information for a plurality of SIP applications, the SIP application configuration information for each SIP application comprising a SIP application identifier (ID) and a list of SIP features, each SIP feature having a SIP feature identifier (ID); a transmitter operable to transmit SIP application configuration information to the SIP enabled device.

In some embodiments, the SIP application configuration information stored on the computer readable memory is stored in the form of an XML (Extensible Markup Language) SIP application configuration information block as SIP application configuration information for each of the at least one SIP application.

In some embodiments, the apparatus further comprises a receiver operable to receive a request for SIP application configuration information.

In some embodiments, the processing logic is further operable to select the SIP application configuration information requested in the received request.

In some embodiments, the transmitter is further operable to transmit SIP application configuration information comprising at least one of: SIP application location information for a SIP enabled device hosting the SIP application; and security information to access the SIP enabled device hosting the application.

According to an eight aspect, there is provided a session initiation protocol (SIP) enabled device comprising: a SIP application manager operable to: receive the SIP application configuration information; store the SIP application configuration information locally; a computer readable memory for storing SIP application configuration information for at least one SIP application, SIP application information for each SIP application comprising a respective SIP application identifier (ID) and a respective list of SIP features, each SIP feature having a respective SIP feature identifier (ID).

In some embodiments, the SIP manager is further operable to transmit a request for SIP application configuration information.

In some embodiments, the SIP enabled device is a SIP server and the SIP application information is information defining SIP applications and SIP features that the SIP server hosts.

In some embodiments, the computer readable memory further comprises a plurality of SIP applications, each SIP application having a SIP application ID, and wherein at least one SIP application of the plurality of SIP applications comprises at least one SIP feature, each SIP feature having a SIP feature ID.

In some embodiments, the SIP enabled device is a SIP client and the SIP application configuration information is information defining only SIP applications and SIP features that are available to the SIP client.

In some embodiments, the SIP client is configured to access only SIP applications and SIP features that are available to the SIP client based on the SIP application configuration information stored on the computer readable memory.

In some embodiments, the SIP application manager is further operable to access SIP application configuration information stored locally on the SIP client for use in selecting a SIP application and a SIP feature associated with the SIP application from a SIP server comprising a plurality of SIP applications.

In some embodiments, the SIP application configuration information further comprises at least one of: SIP application location information for a SIP enabled device hosting the SIP application; and security information to enable authorized access to the SIP enabled device hosting the SIP application.

In some embodiments, the SIP application configuration information stored on the computer readable memory is stored in the form of an XML (Extensible Markup Language) SIP application configuration information block as SIP application configuration information for each of the at least one SIP application.

According to a further aspect, there is provided a computer readable medium storing program instructions executable by a processor of a computing device for causing said computing device to perform the steps of methods described above.

As the complexity of SIP systems increase it will become more important for network providers to control which applications are available on a SIP endpoint, which features an application is allowed to access, and for SIP endpoints to efficiently be able to initiate, control and release SIP sessions with SIP servers that include multiple SIP applications, each SIP application including one or more respective features.

Methods and devices are described herein that provide SIP clients and SIP servers a manner to uniquely identify a SIP application that a SIP session is applicable to and a SIP feature that is being accessed within that SIP application.

Methods and devices are also described herein that provide for the provisioning of SIP clients and the configuration of SIP applications by SIP servers. The SIP application provisioning and configuration information includes at least a SIP application identifier (ID) for each SIP application and a list of SIP features associated with each SIP application, each SIP feature having a respective SIP feature ID.

According to a first broad aspect of the application, a method is provided for a SIP client to select a SIP application and a SIP feature associated with the SIP application by sending a message to a remote SIP server that includes the identification of the SIP application and SIP feature. In some embodiments, the message is generated by the SIP client using SIP application configuration information stored on the SIP client. The SIP application configuration information includes information about SIP applications and associated features and where the SIP applications can be located.

With reference to FIG. 1, an example of a system 100 including a SIP client 110 and a SIP server 150 for implementing methods according to the first aspect of the application will now be described.

FIG. 1 illustrates the SIP client 110 connected to network 190. Also connected to the network 190 is the SIP server 150.

The SIP client 110 includes multiple SIP client applications 115, for example SIP Application 115-1, SIP Application 115-2, . . . , SIP Application 115-M, SIP application provisioning and configuration information 127 and a SIP Client User Agent 120. Examples of SIP applications may include SIP applications for VoIP, instant messaging, video sharing, conferencing with audio, video and slides, and remote library access.

The SIP applications 115 on the SIP client 110 in the illustrated example each have a set of SIP features. SIP Application 115-1 includes three SIP features, namely SIP Feature 1151-1, SIP Feature 1151-2 and SIP Feature 1151-3. SIP Application 115-2 includes one SIP feature, SIP Feature 1152-1. SIP Application 115-M includes multiple SIP features, namely SIP Feature 115M-1, SIP Feature 115M-2, . . . , SIP Feature 115M-N.

In some embodiments, the SIP features for a given SIP application match SIP features of a corresponding SIP application on a remote server, such as SIP Server 150. In some embodiments, the SIP features for a given SIP application do not in their entirety match SIP features on the remote server. For example, the SIP application on the SIP client may be a different version than that which is on the remote server. The SIP client may be provisioned to enable only those features that are supported by both the client and the remote server applications.

SIP application provisioning and configuration information 127 is information that defines attributes of SIP applications located on the network 190 that are available to the SIP client. For example, for a given SIP application available to the SIP client, SIP application provisioning information may indicate if the application may be run and what features are enabled, while the configuration information may include a SIP application identifier, a list of SIP features associated with the SIP application available to the SIP client and SIP feature IDs for each respective SIP feature. In some embodiments, SIP application configuration information is stored on the SIP client and is used by the SIP client to determine which SIP server has a particular SIP application and SIP feature that the SIP client desires to access.

The SIP client user agent 120 acts as an intermediary between the SIP applications and other SIP enabled devices. When the SIP client 110 sends a message to a remote SIP enabled device, such as SIP server 150, it is the SIP client user agent 120 that communicates with the remote SIP enabled device. In an example of selecting a SIP application and a SIP feature, the SIP client user agent 120 contacts the remote SIP server using a SIP destination address of the remote SIP server. The SIP client user agent 120 establishes a connection with a SIP user agent of the remote SIP server.

The SIP client user agent 120 includes a SIP Application Selection Message Generating Module 125. In operation the SIP client user agent 120 receives an indication from one of the SIP applications 115 that the SIP application desires to select a SIP application and SIP feature from a remote SIP server connected to the network 190. After determining if a SIP client is authorized to execute the selected SIP application and SIP feature, the SIP Application Selection Message Generating Module 125 generates a message. In some embodiments, determining if a SIP client is authorized to execute the selected SIP application and SIP feature is based on the SIP application provisioning and configuration information 127 stored on the SIP client 110. In some embodiments, generating the message is based on the SIP application provisioning and configuration information 127. For example, the message may include a destination address of the SIP server, a source address of the SIP client, the SIP application ID of the SIP application with which the SIP application of the SIP client desires to communicate, and the SIP feature ID of the SIP feature with which the SIP application of the SIP client desires to communicate.

The SIP server 150 includes SIP server applications 160, for example SIP application 160-1, . . . , SIP application 160-N, a Security Module 180, and SIP Server User Agent 170. The SIP server applications 160 in the illustrated example each have at least one SIP feature. SIP Application #160-1 includes two SIP features, SIP Feature 1601-1 and SIP Feature 1601-2. SIP Application #160-N includes multiple SIP features, namely SIP Feature 160N-1, SIP Feature 160N-2, . . . , SIP Feature 160N-N. Each SIP application has a SIP application identifier (ID) and each SIP feature has a SIP feature identifier (ID) (not shown).

The SIP features in a given SIP application are components of the given SIP application that provide a specific functionality within the given SIP application. As described above, examples of SIP features that may be included in a VoIP PBX SIP application are call park, call transfer, call waiting, voice mail, Do Not Disturb. Other SIP applications have different types of SIP features.

The SIP Server User Agent 170 acts as an intermediary between the SIP applications and other SIP enabled devices, for example SIP client 120. The SIP Server User Agent 170 receives messages from user agents of the SIP client 110 that enable selecting a SIP application and SIP feature that can be used for initializing, managing and closing out of SIP sessions between the SIP server 150 and the SIP client.

The SIP Server User Agent 170 includes a SIP Application Message Routing Module 175. The SIP Server User Agent 170 receives the message sent by the SIP Client User Agent 120. The SIP Application Message Routing Module 175 then determines which SIP application the message should be routed to based on the SIP application ID in the message and routes the message to the SIP application identified by the SIP application ID in the message. In some embodiments, not all of the entire message is routed to the SIP application identified by the SIP application ID. For example, only a portion of the message, for example at least the SIP feature ID may be routed to the SIP application so that when the SIP application received the portion of the message it can be directed to the SIP feature based on the SIP feature ID in the message.

The Security Module 180 includes information that may be used to determine if a SIP client has the authority to execute a SIP application and SIP feature that are selected by the SIP client. For example, when the SIP client sends a message to the SIP server to select a SIP application, the message may also include a user identification and a password. The Security Module 180 determines if the SIP client is authorized to execute the selected application based on the received user identification and password. In some embodiments, the SIP client and SIP server may use an alternative means of determining if a SIP client has the authority to execute a SIP application and SIP feature that are selected by the SIP client such as a share key or certificate between the SIP client and SIP server.

In some embodiments, the SIP Application Message Routing Module 175 may check with the Security Module 180 to confirm that the SIP client has the authority to execute a SIP application that is selected.

The SIP applications 160 each include a Feature ID Recognition Module 165. Following receipt of the message at the SIP application identified by the SIP application ID, the Feature ID Recognition Module 165 in the SIP application recognizes the SIP feature ID in the message and completes the routing of the message to the SIP feature identified by the SIP feature ID in the message.

In some embodiments, the SIP server includes SIP application configuration information. The SIP application configuration information is stored on the SIP server and may be used by the SIP server to determine which SIP applications and SIP features that the SIP server is hosting.

In some embodiments, the Feature ID Recognition Module 165 may check with the Security Module 180 to confirm that the SIP client has the authority to execute a SIP feature that is selected.

The SIP client 110 may be any type of wired or wireless device, for example a wireless cell phone, a wireless MODEM enabled computer, a wireless enabled personal data assistant (PDA) and similar types of wired devices. A particular example of a wireless SIP client will be described below with reference to FIG. 7.

Only a single SIP client 110 and a single SIP server 150 are shown connected to the network 190. The system 100 that implements aspects described in the application may include any number of SIP clients. Furthermore, there may be more than one SIP server connected to the network. When there are multiple SIP servers that can be accessed by the SIP clients, the SIP servers may host separate and distinct SIP applications or SIP applications may be duplicated on more than one SIP server. A particular example of a system including multiple SIP clients and multiple SIP servers will be described below with reference to FIG. 6.

The information concerning which SIP server hosts a specific SIP application may be provided to the SIP client user agent during a configuration and provisioning phase as SIP application provisioning and configuration information 127. Methods and devices are described below for implementing a configuration and provisioning phase.

M SIP applications are illustrated on the SIP client 110 in FIG. 1. N SIP applications are illustrated on the SIP server 150 in FIG. 1. The values of M and N are for illustrative purposes and it is to be understood that the number of SIP applications on either device could be one or more.

In some embodiments, M=N and each of the SIP applications on the SIP client 110 correspond to a respective SIP application on the SIP server 150. In some embodiments, M=N and some, but not all of the SIP applications on the SIP client 110 correspond to respective SIP applications on the SIP server 150. When M>N, at most N of the M SIP applications on the SIP client 110 have a corresponding SIP application on the SIP server 150. When M<N, the SIP server 150 may include a corresponding SIP application for each SIP application on the SIP client 110, as well as additional SIP applications that may be accessible by other SIP clients.

In some embodiments, each of the SIP client applications 115 on the SIP client 110 has a corresponding SIP application 160 on the SIP server 150. In some embodiments, SIP applications 115 are grouped into subsets of SIP applications and each subset of SIP applications have a corresponding subset of SIP applications on a different respective SIP server.

SIP Applications 160-1 and 160-N on the SIP server 150 in FIG. 1 are shown to have two and N SIP features, respectively. These examples are not intended to limit the number of SIP features of any given SIP server application and it is therefore understood that a SIP server application may have only a single feature or have multiple features.

In some embodiments, there may be SIP applications on the SIP server that have no SIP features. When there are no SIP features on the SIP application only a SIP application ID, or some other method, is used to select the SIP application.

In some embodiments, the SIP client applications 115 and the SIP Client User Agent 120 on the SIP client 110 and the SIP server applications 160 and SIP features on the SIP server 150 are implemented by computer readable programmable code instructions stored on a computer readable medium in the SIP client and SIP server, respectively. As such, the various blocks in FIG. 1 representing the elements on the SIP client and SIP server are computer algorithms for implementing the functionality of the elements. However, other implementations are possible. The functionality of the various blocks may be implemented as software, hardware, firmware, or as any appropriate combination of software, hardware and firmware.

A method for use by a SIP client to select a SIP application and a SIP feature associated with the SIP application will now be described with reference to FIG. 2.

Figure 2:
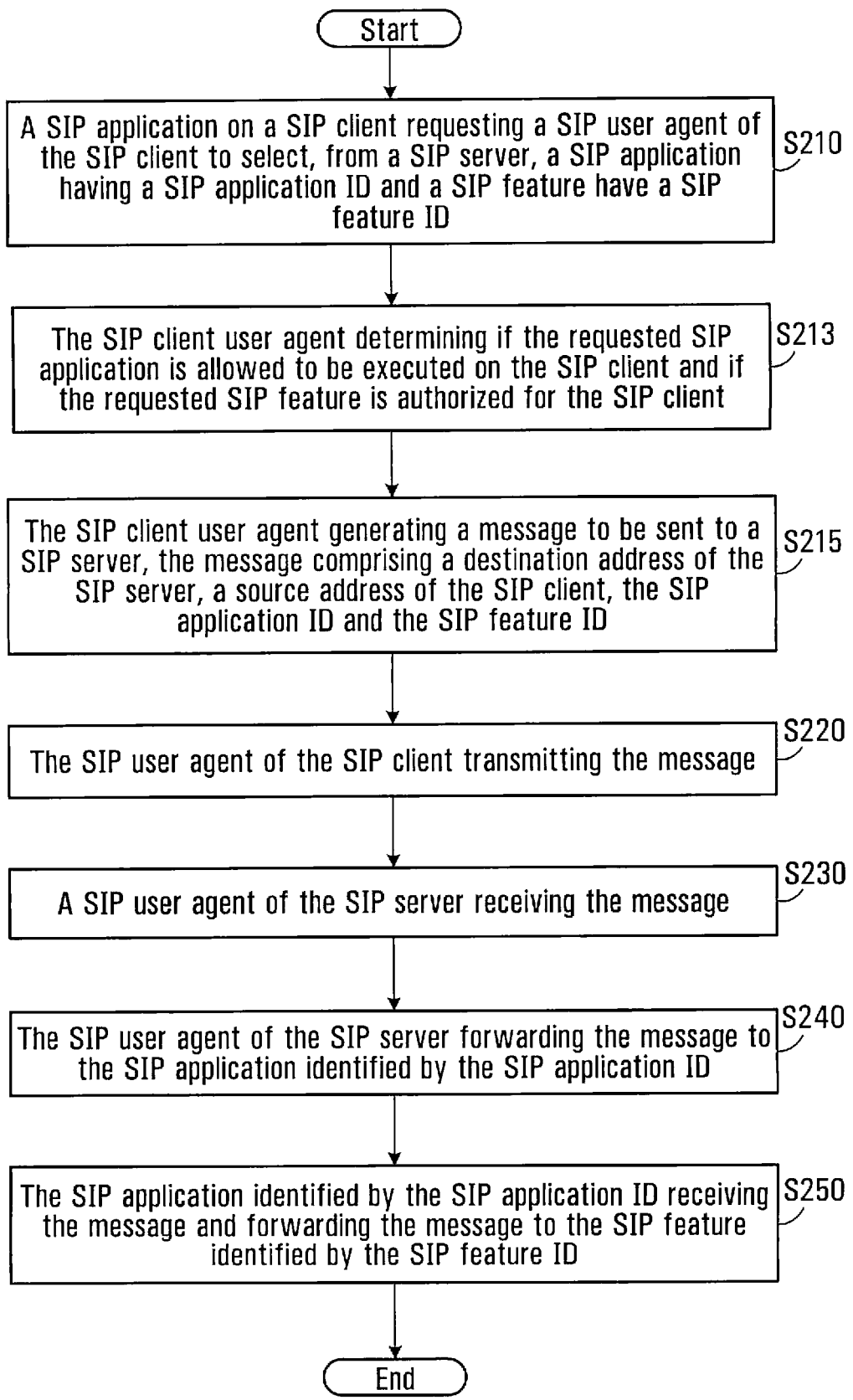
FIG. 2 is a flow chart of a method for a SIP client selecting from a SIP server a SIP application and a SIP feature associated with the SIP application according to an embodiment of the application.

FIG. 2 describes a method which includes steps performed by both the SIP client and the SIP server, but it is to be understood that FIG. 2 also provides methods capable of being performed by the SIP client or the SIP server individually. More specifically, steps S210, S213, S215 and S220 executed by the SIP client would be a method performed by the SIP client and steps S230, S240 and S250 executed by the SIP server would be a method performed by the SIP server.

In a first step S210 of FIG. 2, a SIP application on a SIP client requests a SIP client user agent select a SIP application and a SIP feature associated with the SIP application. With reference to FIG. 1 for example, SIP Application 115-1 of the SIP client 110 requests SIP Client User Agent 120 select a SIP application on a remote SIP server corresponding to SIP Application 115-1 and a particular SIP feature associated with the selected SIP application, for example a SIP feature corresponding to SIP feature 1151-1.

In a second step S213 of FIG. 2, the SIP client user agent makes use of SIP application provisioning information stored on the SIP client to confirm that the requested SIP application is allowed to be executed on the SIP client and that the requested feature is authorised for use on the SIP client. With reference to FIG. 1 for example, SIP Client User Agent 120 determines whether the requested SIP application is allowed to be executed on the SIP client and the requested feature is authorised for use on the SIP client by referring to the SIP application provisioning information in SIP application provisioning and configuration information 127.

If allowed and authorised, in a third step S215, the SIP client user agent generates a message to be sent to a SIP server. In some embodiments, the SIP client user agent includes a SIP application selection message generator to create the message. The SIP application selection message generator accesses SIP application configuration information stored on the SIP client. Based on the SIP application configuration information, the SIP application selection message generator determines the identification of a SIP server that hosts the SIP application and SIP feature desired by the SIP client application and then generates a message to be sent to the SIP server. The message includes a destination address of the SIP server, a source address of the SIP client, the SIP application ID of the SIP application with which the SIP application of the SIP client desires to communicate, and the SIP feature ID of the SIP feature with which the SIP application of the SIP client desires to communicate. With reference to FIG. 1, application selection message generator 125 determines that a SIP application corresponding to SIP application 115-1 is SIP application 160-1 located on SIP server 150, which has SIP feature 1601-1, which corresponds to SIP feature 1151-1. The SIP Application Selection Message Generator 125 then generates a message including the above-described message information.

In a fourth step S220, the SIP client user agent outputs the message for transmission to the SIP server. With reference to FIG. 1, SIP Client User Agent 120 outputs the message for transmission.

In a fifth step S230, the SIP server user agent of the SIP server receives the message sent by the SIP client. With reference to FIG. 1, SIP Server User Agent 170 receives the message.

In a sixth step S240, the SIP server user agent forwards the message to the SIP application identified by the SIP application ID in the message. In some embodiments, the entire received message is not forwarded on to the SIP application. For example, only a portion of the message defining the SIP feature ID for the SIP application may be forwarded. With reference to FIG. 1, the SIP Application Message Routing Module 175 forwards the message to SIP application 160-1.

In a seventh step S250, the SIP application identified by the SIP application ID in the message receives the message, or portion thereof, and recognizes a feature ID in the message. The SIP application then completes the routing of the message to the identified SIP feature. With reference to FIG. 1, the Feature ID Recognition Module 165 recognizes the feature ID in the message and forwards the message to SIP feature 1601-1.

In some implementations, not all of the above steps may be performed. For example, when only SIP applications and SIP features that are authorized to be used on a SIP client are provisioned on the SIP client, step S213, the step of the SIP client user agent confirming that the requested SIP application is allowed to be executed on the SIP client and that the requested feature is authorised for use on the SIP client is not to be performed.

The message sent by the SIP client may include "To" and "From" headers to define a destination address of an end user and a source address of the SIP client, respectively.

In some embodiments, the destination address sent in the message is a SIP uniform resource identifier (URI). In some embodiments the destination address is an email address. Other examples of destination addresses may be a phone number, a name, or any form of identification that the SIP server may translate to an endpoint.

A particular example of a "To" address is "To:<sip:user_1@sip.xyz.net:5060>" where "user_1" is the destination, "sip.xyz.net" is a SIP server, and "5060" is a server port address. This is of course one particular example of a "To" address and it is to be understood that such a format is not intended to limit the scope of the application.

In some embodiments, the SIP application ID and the SIP feature ID, which are requested by the SIP client are included in the message as an extension of the destination address. An example of the destination address with SIP application ID and SIP feature ID included as an extension is "To:<sip:user_1@sip.xyz.net:5060; +SIP_App_Id=APPY; +SIP_Feat_Id=FEATURE X>". The initial portion of the destination address is as described above. The extension includes the terms "+SIP_App_Id=APPY" to identify the SIP application ID as "APP Y" and "+SIP_Feat_Id=FEATURE X" to identify the SIP feature ID as "FEATURE X". This is of course one specific manner of adding an extension, but is not meant to limit a format of the extension to only this type.

With reference to FIG. 1, a particular example of a destination address with SIP application and feature ID information is "To:<sip:user 1@SIP_server_domain_name.com; +SIP_App_Id=SIP Application 160-1; +SIP_Feat_Id=SIP Feature 1601-1>".

When a SIP server includes security features so as to ensure only authenticated SIP clients are allowed access to the SIP server and/or to ensure that SIP clients are provisioned with only SIP application configuration information for SIP applications and SIP features that are authorized, the SIP clients may each include a user identification and a password in a transmitted message to enable authorized access to the SIP server. In some embodiments, the SIP server ensures only authenticated SIP clients are allowed access to the SIP server and/or to ensure that SIP clients are provisioned with only SIP application configuration information for SIP applications and SIP features that are authorized by employing a shared key or certificate. These are merely two examples of security measures that could be used, other security measures are also possible.

The method described above may be used for selecting a SIP application and SIP feature when initiating a SIP session between two SIP enabled devices, such as a SIP client and a SIP server, when managing a SIP session between two SIP enabled devices, or when closing out a session between two SIP enabled devices.

In some embodiments, the message sent by the SIP client user agent is an INVITE message. An INVITE message is used to start a SIP session between two SIP enabled devices, for example the SIP client and SIP server. With reference to the example above, this is a SIP session between SIP Application 115-1 of the SIP client 110 and SIP Application 160-1 and SIP Feature 1-1 of the SIP Server 150.

In some embodiments, the message sent by the SIP client user agent is a NOTIFY message. A NOTIFY message is used to close out a SIP session between two SIP enabled devices.

Once a session has been established between the SIP client and SIP server, a session identifier, for example a CALL ID, may be used by the user agents of the SIP client and SIP server to correctly route further messages.

According to a second broad aspect of the application, a method is provided for a SIP enabled device, for example a SIP client or a SIP server to be provided with SIP application provisioning and configuration information by a configuration server. In some embodiments, the SIP application configuration information is used to configure the SIP enabled device remotely by the configuration server, while simultaneously provisioning the SIP enabled device with information. For example, in the case of the configuration server communicating with a SIP client, once the SIP client has been configured with the SIP application configuration information, the SIP client may use the SIP application configuration information to select SIP applications and SIP features located on remote SIP servers. In the case of the configuration server communicating with a SIP server, the SIP application configuration information may be used to determine which SIP applications and features are hosted by the SIP server.

In some embodiments, the SIP application configuration information provided by the configuration server defines information only for SIP applications and SIP features that are available to a SIP client.

In the case of the configuration server providing the SIP client with the SIP application provisioning and configuration information, the configuration server determines which SIP applications and SIP features are available to the SIP client so that the appropriate SIP application configuration information is provided to the SIP client. For example, the SIP client may subscribe to a particular group of SIP applications from a service provider and therefore only those applications are available to the SIP client. Furthermore, the SIP client may subscribe to only a limited number of SIP features for a particular SIP application, not necessarily all available SIP features for that SIP application. In some embodiments, the configuration server has SIP client specific information stored locally on the configuration server to enable determining what SIP application configuration information to send to the SIP client. In some embodiments, the configuration server accesses client specific information from elsewhere around the network.

SIP application configuration information that is stored on the SIP client may be used by the SIP client to determine which SIP server has a particular SIP application and SIP feature that the SIP client desires to access, for example as described in the first broad embodiment above.

SIP application configuration information may include some or all of: SIP application location information such as an Internet Protocol (IP) address and port number of a SIP server that is hosting the SIP application; security information such as a user ID and password to allow authorized access to the SIP server that is hosting the SIP application; a SIP application ID; a list of SIP features associated with the SIP application and SIP feature IDs for each respective SIP feature; SIP realm information in which a realm is a server group that has a common authentication for the SIP enabled device receiving the SIP application information; and SIP domain information.

In some embodiments, SIP application configuration information is hardwired into the SIP applications on the SIP client. For example, the SIP application configuration information may be installed on the SIP client at the time of manufacture of the SIP client or by a service provider before sale of the SIP client to the public. SIP application configuration information that is hardwired into the SIP applications may be supplemented or supplanted by new information provided by the configuration server. An indication in the information provided by the configuration server can indicate how the new information should be treated.

In some embodiments, SIP application configuration information is provided to the SIP client from the configuration server. The SIP application configuration information may be transmitted over-the-air (OTA) between the SIP client and the configuration server, over a wired connection between the SIP client and the configuration server or some combination of the two.

In some embodiments, the SIP application configuration information is provided from the configuration server to the SIP client based on a request from the SIP client to the configuration server for the application configuration information. For example, on initialization of the SIP client, a SIP application manager in the SIP enabled device contacts the configuration server and directly requests the SIP application configuration information. Examples of initialization of the SIP client may be considered to be when the SIP client is powered on, when it is determined the current SIP application configuration information is older than a given time period, or when new configuration information, such as a new service book is received. The request may be made, for example, through a cellular carrier or over the Internet. After authenticating that the SIP client is authorized to communicate with the configuration server, the configuration server sends the requested SIP application configuration information to the SIP client.

In other embodiments, the SIP application configuration information is provided to the SIP client by the configuration server "pushing" the information to the SIP client without being specifically requested by the SIP client. The information may be pushed to the SIP client for any one of multiple reasons. For example, when the configuration server enters the network it may send out a message including SIP application configuration information to all SIP clients in communication range of the configuration server. In another example, the configuration server may send out a message including updated SIP application configuration information to all SIP clients in communication range of the configuration server when at least some of the SIP application configuration information is updated. For instance, when SIP application configuration information is changed for a SIP client due to a change in the SIP applications and SIP features subscribed to by the SIP client.

SIP application configuration information may also be stored on the SIP server and be used by the SIP server to determine which SIP applications and SIP features that the SIP server is hosting.

In some embodiments, the SIP application configuration information for each SIP application that the SIP server hosts is hard coded into the SIP server.

In some embodiments, SIP application configuration information for SIP applications that the SIP server hosts are provided to the SIP server from the configuration server. The SIP application configuration information may be transmitted over-the-air (OTA) between the SIP client and the configuration server, over a wired connection between the SIP client and the configuration server or some combination of the two.

In some embodiments, the functionality of the configuration server is included on a SIP server, enabling the SIP server to provide SIP application configuration information to other SIP enabled devices such as SIP clients and other SIP servers.

In some embodiments, the configuration server is implemented as a non-SIP server, accessed via some other IP protocol.

Figure 3:
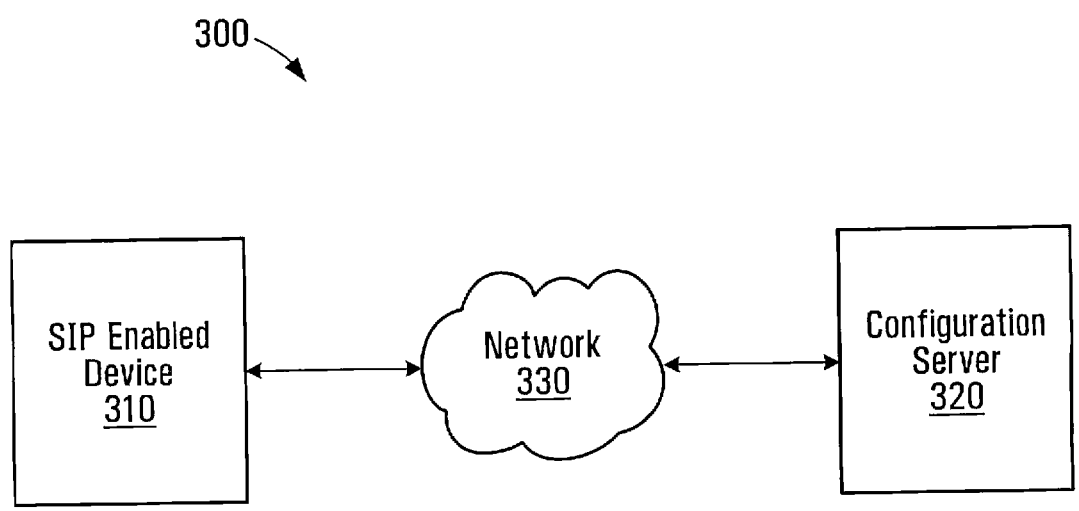
FIG. 3 is a block diagram of a session SIP enabled device and a configuration server communicating according to an embodiment of the application.

FIG. 3 illustrates a system 300 including a SIP enabled device 310 and a configuration server 320 connected to network 330 for implementing methods of providing SIP application configuration information described herein.

The SIP enabled device 310 may be, for example a SIP client or a SIP server as described above.

Only a single SIP enabled device 310 and a single configuration server 320 are shown connected to the network 330. The system 300 that implements aspects described in the application may include any number of SIP enabled devices 310. Furthermore, there may be more than one configuration server in the system 300. An example of a configuration server will be described below in further detail with reference to FIG. 5A. An example of a SIP enabled device will be described below in further detail with reference to FIG. 5B.

A method for configuring a SIP enabled device, for example a SIP client or a SIP server, with SIP application configuration information will be described with reference to FIG. 4.

Figure 4:
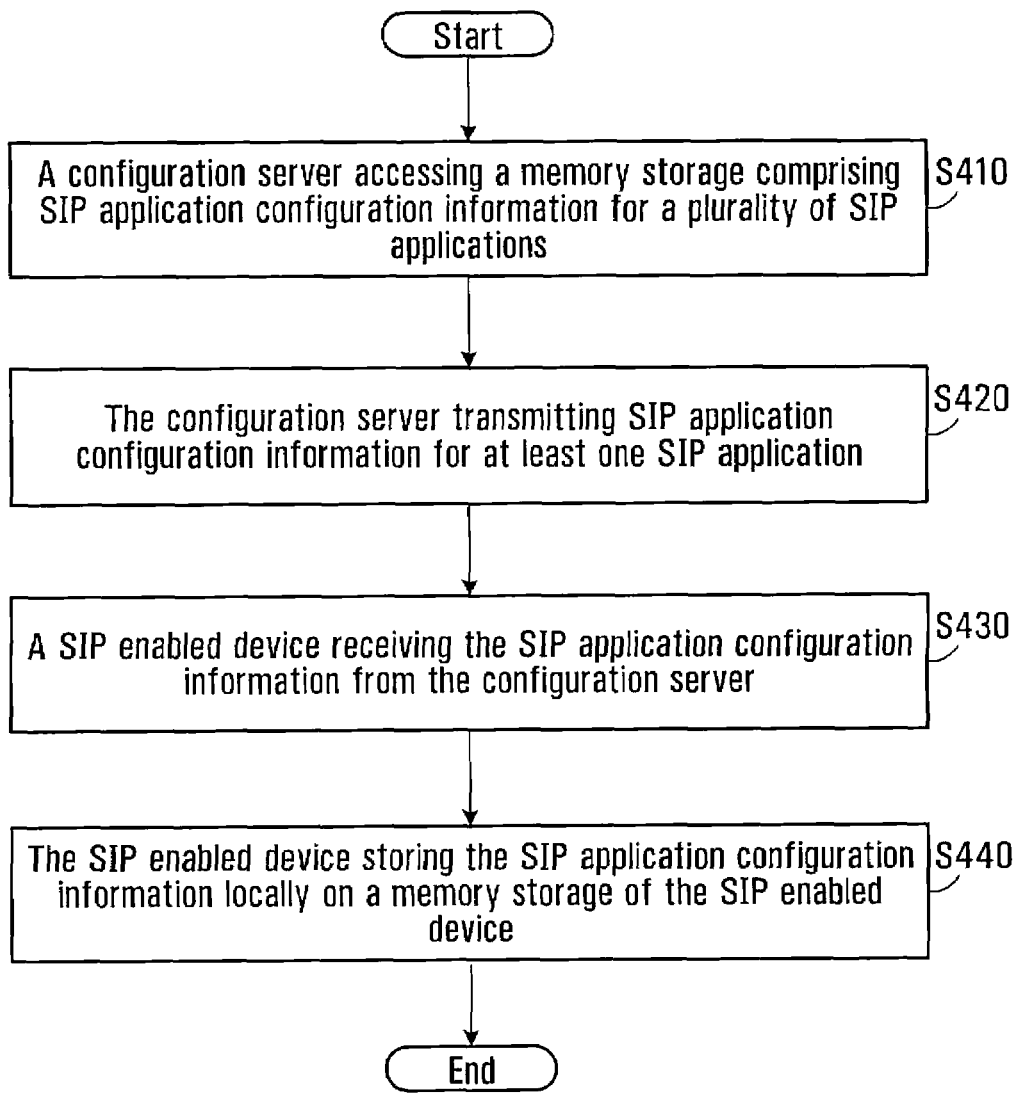
FIG. 4 is a flow chart of a method for providing configuration information to a SIP enabled device from a configuration server according to an embodiment of the application.

FIG. 4 describes a method which includes steps performed by both the SIP enabled device and the configuration server, but it is to be understood that FIG. 4 also provides methods capable of being performed by each of the SIP enabled device and the configuration server individually. More specifically, steps S410 and S420 executed by the configuration server would be a method performed by the configuration server and steps S430 and S440 executed by the SIP enabled device would be a method performed by the SIP enabled device.

Step S410 involves the configuration server accessing a memory storage comprising SIP application configuration information for a plurality of SIP applications. For each SIP application that SIP application configuration information is maintained, the SIP application configuration information may include some or all of: SIP application location information such as an Internet Protocol (IP) address and port number of a SIP server that is hosting the SIP application; security information such as a user ID and password to allow authorized access to the SIP server that is hosting the SIP application; a SIP application ID; a list of SIP features associated with the SIP application and SIP feature IDs for each respective SIP feature; SIP realm information in which a realm is a server group that has a common authentication for the SIP enabled device receiving the SIP application information; and SIP domain information.

Step S420 involves the configuration server transmitting SIP application configuration information including SIP application information for at least one SIP application.

In some embodiments when the SIP enable device is a SIP client, the configuration server sends SIP application configuration information for only SIP applications and SIP features that are available to a particular SIP client. In such a case, this may result in the configuration server further determining what SIP applications and SIP features are available to a particular SIP client and sending the appropriate SIP application configuration information. Determining which SIP applications and SIP features are available to a particular SIP client may, for example, involve the configuration server accessing SIP client specific information that defines which SIP applications and SIP features are available to a given SIP client.

Step S430 involves the SIP enabled device receiving SIP application information from the configuration server.

Step S440 involves the SIP enabled device storing the received SIP application information locally on a memory storage of the SIP enabled device. In some embodiments, the SIP enabled device uses the stored SIP application configuration information to configure the SIP enabled device. The SIP enabled device is configured such that the only SIP applications and SIP features that are available to the SIP enabled device are SIP applications and SIP features for which the SIP enabled device has SIP application configuration information.

In some embodiments, the SIP configuration information is encrypted before being stored in the configuration server, thus protecting it from external tampering.

As discussed above, in some embodiments the SIP enabled device transmits a request for SIP application configuration information for at least one SIP application. With reference to FIG. 4, this would occur prior to step S410. Also occurring prior to step S410 in a situation when the SIP enabled device transmits a request for SIP application configuration information, is a further step in which the configuration server receives the request.

Also occurring in a situation when the SIP enabled device transmits a request for SIP application configuration information, is a further step in which the configuration server selects the SIP application configuration information requested in the received request. This step occurs after the configuration server accesses a memory storage S410, but before the configuration server transmits SIP application configuration information S420.

In some embodiments, when a request for SIP application configuration information is received by the configuration server, the configuration server authenticates the SIP enabled device that sent the request based on security information sent by the SIP enabled device with the request. The security information may include a user identification and a password or may employ the use of a shared key or certificate between the SIP enabled device and the configuration server.

Figure 5A:
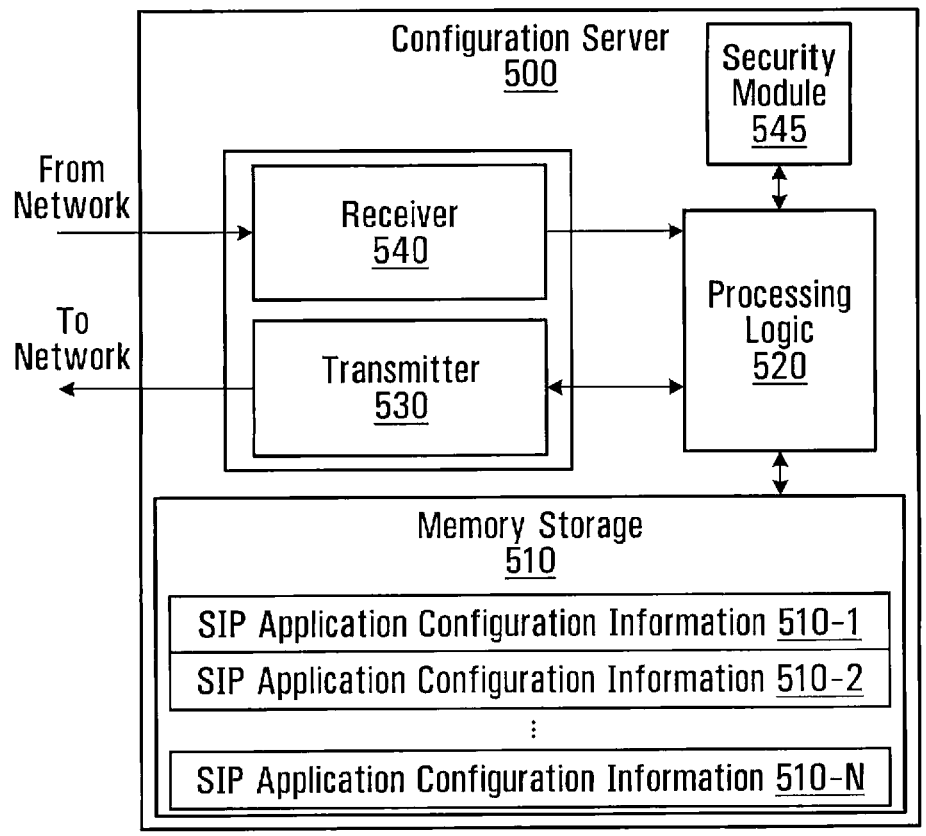
FIG. 5A is a block diagram of a configuration server for providing SIP application information to a SIP enabled device according to an embodiment of the application.

With reference to FIG. 5A, a particular example of a configuration server 500 will now be described.

The configuration server 500 includes a Memory Storage 510 for storing SIP application configuration information, Processing Logic 520, a Security Module 545, a Transmitter 530 and a Receiver 540.

The Receiver 540 receives requests for SIP application configuration information from SIP clients and/or SIP servers. The Transmitter 530 transmits or pushes SIP application configuration information to SIP clients and/or SIP servers.

The Security Module 545 includes information that is used to determine if a SIP enabled device is authorized to access the configuration server. For example, when the SIP enabled device sends a request to the configuration server to select a SIP application, the request may also includes a user identification and a password. The Security Module 545 determines if the SIP enabled device is authorized to access the configuration server based on the received user identification and password. In some embodiments, the Security Module 545 can further determine which SIP applications and SIP features that the SIP enabled device requesting the configuration information is authorized to use. As a result, only configuration information for the authorized SIP applications and SIP features is provided to the SIP enabled device.

In some implementations, the Security Module 545 may not be included in the configuration server. For instance, if the SIP application configuration information is "pushed" to the SIP enabled device, without a specific request for the SIP application configuration information.

The memory storage 510 includes SIP application configuration information for multiple SIP applications. For example, a first SIP application has SIP application configuration information 510-1, a second SIP application has SIP application configuration information 510-2 and an Nth SIP application has SIP application configuration information 510-N. For each SIP application that SIP application configuration information is maintained, the SIP application configuration information may include some or all of: SIP application location information such as an Internet Protocol (IP) address and port number of a SIP server that is hosting the SIP application; security information such as a user ID and password to allow authorized access to the SIP server that is hosting the SIP application; a SIP application ID; a list of SIP features associated with the SIP application and SIP feature IDs for each respective SIP feature; SIP realm information in which a realm is a server group that has a common authentication for the SIP enabled device receiving the SIP application information; and SIP domain information.

SIP application configuration information for N SIP applications is illustrated on the configuration server in FIG. 5A. The values N is for illustrative purposes and it is to be understood that the SIP application configuration information may be for one or more SIP applications.

In some embodiments, the SIP application configuration information stored on the storage memory 510 is stored in the form of an XML (Extensible Markup Language) SIP application information block. The XML SIP application information block may be divided into sub-blocks in which each sub-block includes SIP application configuration information for each of the plurality of SIP applications.

The processing logic 520 accesses the memory storage 510 and selects SIP application information for at least one of a plurality of SIP applications to send to the SIP clients and/or SIP servers.

When the configuration server 500 receives a request for SIP application configuration information, the processing logic 520 is provided with the request by the receiver 540 and the processing logic 520 selects SIP application configuration information from the memory storage 510 based on the received request.

In some embodiments, when a request for SIP application configuration information is received by the configuration server 500, at least one of: the receiver 540; the processing logic 520; or the receiver 540 and processing logic 520 in combination authenticate the SIP enabled device that sent the request based on security information sent by the SIP enabled device along with the request.

In some embodiments, the configuration server includes SIP enabled device specific information for determining appropriate SIP application configuration information that should be used in configuring the SIP enabled device. In some embodiments, the configuration server includes a module for obtaining SIP enabled device specific information from elsewhere over the network for determining appropriate SIP application configuration information that should be used in configuring the SIP enabled device.

Figure 5B:
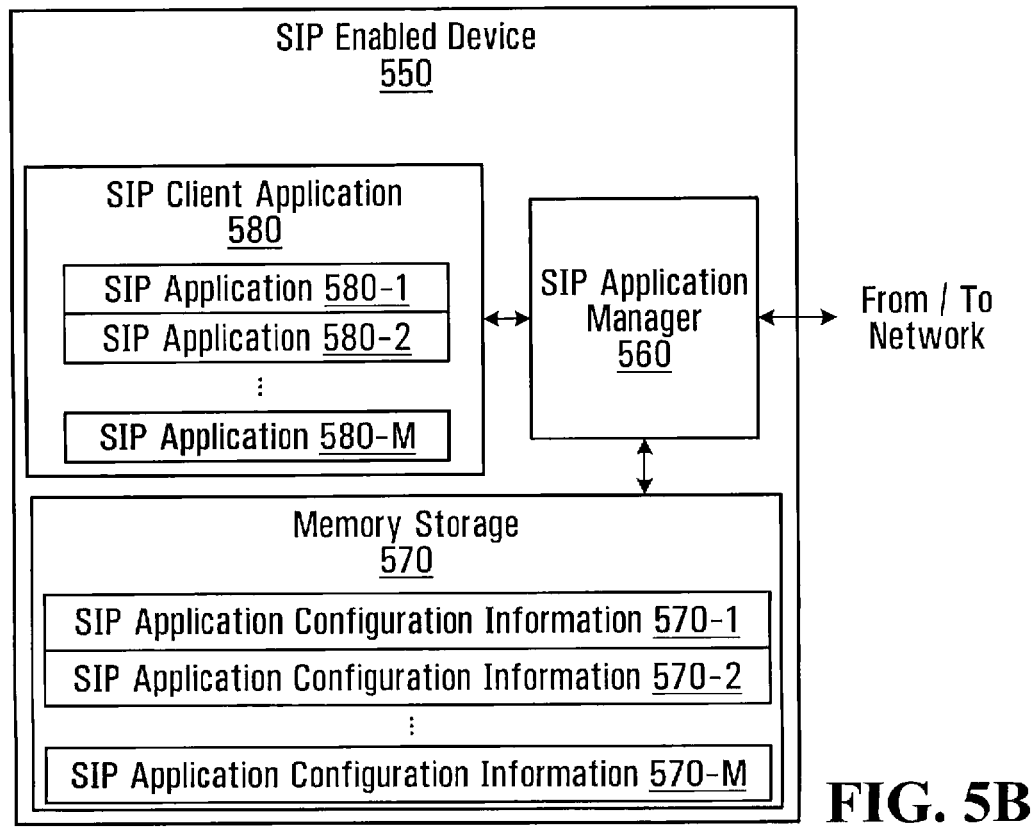
FIG. 5B is a block diagram of a SIP enabled device operable to be configured by a configuration server according to an embodiment of the application.

With reference to FIG. 5B a particular example of a SIP enabled device 550 operable to communicate with a configuration server will now be described.

The SIP enabled device 550 includes a SIP application manager 560, a memory storage 570 and SIP applications 580.

The SIP application manager 560 is operable to perform multiple functions such as transmitting requests to the configuration server for SIP application configuration information for at least one SIP application, receiving the SIP application configuration information that is pushed down to it from the configuration server, and storing the received SIP application configuration information locally in the memory storage 570.

The memory storage 570 stores the SIP application configuration information for the at least one SIP application that SIP applications on the SIP enabled device may wish to access. For example, a first SIP application has SIP application configuration information 570-1, a second SIP application has SIP application configuration information 570-2 and an Mth SIP application has SIP application configuration information 570-M. For each SIP application that SIP application configuration information is maintained, the SIP application configuration information may include some or all of the information listed above with reference to the configuration server.

SIP application configuration information for M SIP applications is illustrated on the SIP enabled device in FIG. 5B. The values M is for illustrative purposes and it is to be understood that the SIP application configuration information may be for one or more SIP applications.

In some embodiments, the SIP enabled device 550 is a SIP client that is remotely configured by the configuration server based on the SIP application configuration information from the configuration server. The SIP application configuration information may define only SIP applications and SIP features that are available to the SIP client. When the SIP enabled device is a SIP client, in some embodiments, the SIP client includes functional elements, such as a SIP client user agent, that enable communication with a SIP server and selection of SIP applications and SIP features from the SIP server.

In some embodiments, the SIP enabled device 550 is a SIP server that uses the SIP application configuration information from the configuration server to define SIP applications and SIP features that the SIP server hosts. When the SIP enabled device is a SIP server, in some embodiments, the SIP server includes elements, such as a SIP server user agent, that enable communication with a SIP client.

In some embodiments, the SIP applications 580 and the SIP Application Manager 560 on the SIP enabled device 550 and the processing logic 570 are implemented by computer readable programmable code instructions stored on a computer readable medium in the SIP enabled device and configuration server, respectively. As such, the various blocks in FIGS. 5A and 5B representing the elements in the SIP enabled device and configuration server are computer algorithms for implementing the functionality of the elements. However, other implementations are possible. The functionality of the various blocks may be implemented as software, hardware, firmware, or as any appropriate combination of software, hardware and firmware.

In some implementations, the SIP Application Manager 560 is a software module that is physically located within a SIP enabled device user agent file structure. In some implementations, the SIP Application Manager 560 is a software module that is separate from the user agent.

Figure 6:
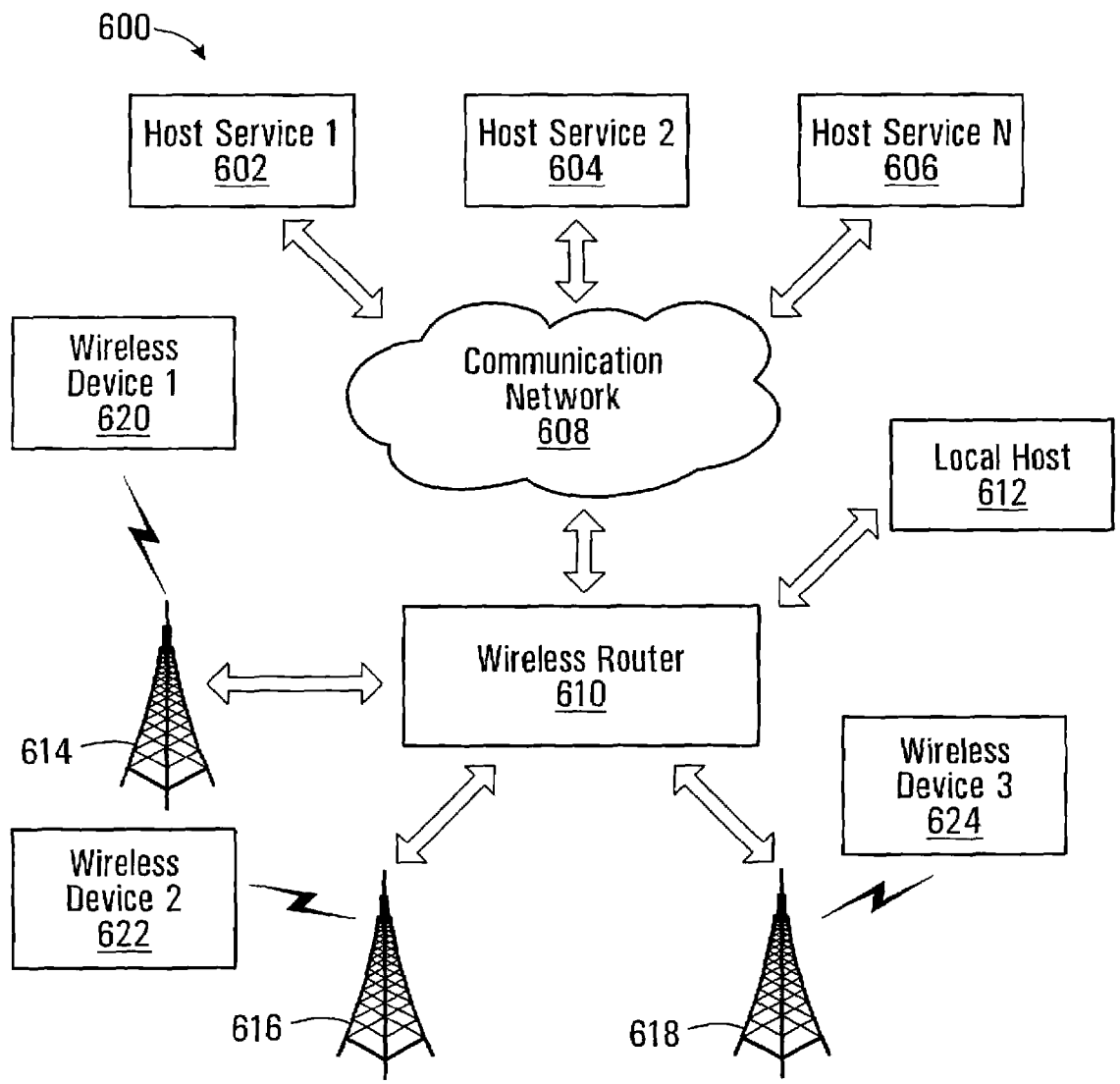
FIG. 6 is a block diagram of an example communications network on which embodiments of the application may be implemented.

FIG. 6 is an exemplary environment in which a wireless communication system 100 in accordance with some embodiments may be practiced. SIP signalling between illustrated network elements can be implemented using the above-summarized methods and systems. The exemplary wireless communication system 600 includes a plurality of host services (three shown, 602, 604, and 606), each of which may have a plurality of SIP applications, with one or more of the SIP applications having at least one SIP feature available to their subscribers. In this particular example, the host services 602, 604, and 606 are typically configured as servers, each containing at least one processor, a storage means and each using a network interface over which communications with a communication network 608 such as the Internet can be effectuated. The information storage means may include storage for SIP application configuration information. The at least one software module may include for example SIP server applications, a SIP Server User Agent, a SIP Application Message Routing Module and/or a SIP Application Manager. The host services 602, 604 and 606 send and receive messages over communications network 608 to and from wireless router system 610 allowing communication between the host services 602, 604, and 606 and the wireless router system 610.

The wireless router system 610 is connected to a plurality of wireless networks (three shown, 614, 616, and 618), each of which may support a plurality of mobile devices (one in each wireless network is shown, 620, 622, and 624). The wireless networks 614, 616, and 618 may be a cellular telephone network, such as a global system for mobile communication (GSM) network, or a code division multiple access (CDMA) network, a two-way paging network, a short range wireless network such as Bluetooth™, an IEEE 802.11 compliant network, and others alike. The mobile devices 620, 622, and 624 are devices compatible with the corresponding wireless network. Mobile devices 620, 622, and 624 may be considered to be SIP client devices according to embodiments of the application described above.

Mobile communications devices 620, 622 and 624 are two-way communication devices with advanced data communication capabilities having the capability to communicate with other mobile devices or computer systems, such as host services 602, 604, 606, through a network of transceiver stations, including wireless router 610 and communication network 608. The mobile communication devices 620, 622 and 624 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practiced with any type of mobile device, whether listed above or not. In the example shown in FIG. 6, mobile communications devices 620, 622 and 624 each contain a processor, a radio, an information storage means and at least one software module adapted to perform tasks. The information storage means may include storage for SIP application configuration information. The at least one software module may include for example SIP client applications, a SIP Client User Agent, a SIP Application Selection Message Generating Module and/or a SIP Application Manager. In some embodiments, mobile communications devices 620, 622 and 624 are capable of sending and receiving messages using the radio. Also in some embodiments, the at least one software module includes an event generator module, adapted to generate events, and a communications module, adapted to send and receive messages using the mobile communications device's radio.

Mobile communications devices are generally capable of communicating over multiple communication channels. For example, short message service (SMS) messages arrive over the voice communication channel, whereas email messages arrive over a data communication channel. As explained above, the mobile communications device 620 includes modules, software for example, which are adapted to perform various tasks when executed in mobile communications device 620's processor. In one embodiment, the mobile communications device 620 contains both a communication module and an event generator module. The communication module is adapted to execute in mobile communications device 620's processor and in cooperation with the mobile communications device 620's radio is capable of sending and receiving messages. The event generator module is also adapted to execute in mobile communications device 620's processor and is capable of generating events in one of two ways: user generated events and device generated events. User generated events include such things as the user of mobile communications device 620 opening a messaging application resident in mobile communications device 620, such as an email application, the user of mobile communications device 620 rolling a wheel input device, such as a thumbwheel, the user of mobile communications device 620 pressing a key on mobile communications device 620's keyboard, the user of mobile communications device 620 logging in to mobile communications device 620 or the user of mobile communications device 620 electing to maintain an active session by responding to a prompt from mobile communications device 620. Device generated events include such things as the expiry of a timer, mobile communications device 620 generating a ping message to keep a session alive with the network or mobile communications device 620 commencing a data session, such as a PDP context, with a network.

One of the primary purposes of host services 602, 604 and 606 is to process information received from other sources, such as mail servers (not shown) and mobile communications devices 620, 622, 624, and send the information on to the appropriate recipient, typically a different host service 602, 604, 606, mail server or mobile communications device 620, 622 or 624. Host services 602, 604 and 606 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 602, 604 and 606 also contain a software module, which executes in their processor to achieve the desired sending and receiving of messages as well as the appropriate processing of information. In some embodiments the software module of each host service 602, 604, 606 is a messaging module, the messaging module is adapted to receive messages from at least one external mail server, send messages to mobile communications devices 620, 622, 624, receive messages from the same mobile communications devices and send messages to the at least one external mail server(s). The at least one external mail server(s) could also be at least one mobile data server(s) for example. The wireless router system 610 may also be directly connected to a host service, such as a local service 612, without the communication network 608. In another embodiment, it is possible for host services 602, 604 and 606 to communicate directly with mobile communications devices 620, 622 and 624. In this embodiment, host services 602, 604 and 606 must be capable of addressing communications to mobile communications devices 620, 622 and 624 without the aid of the wireless router system 610.

The host services 602, 604 and 606 may be used for providing SIP applications and SIP features according to methods described above. The host services may also be used for configuring mobile communication devices 620, 622 and 624 or other host services by providing SIP application and SIP feature information according to methods described above.

Figure 7:
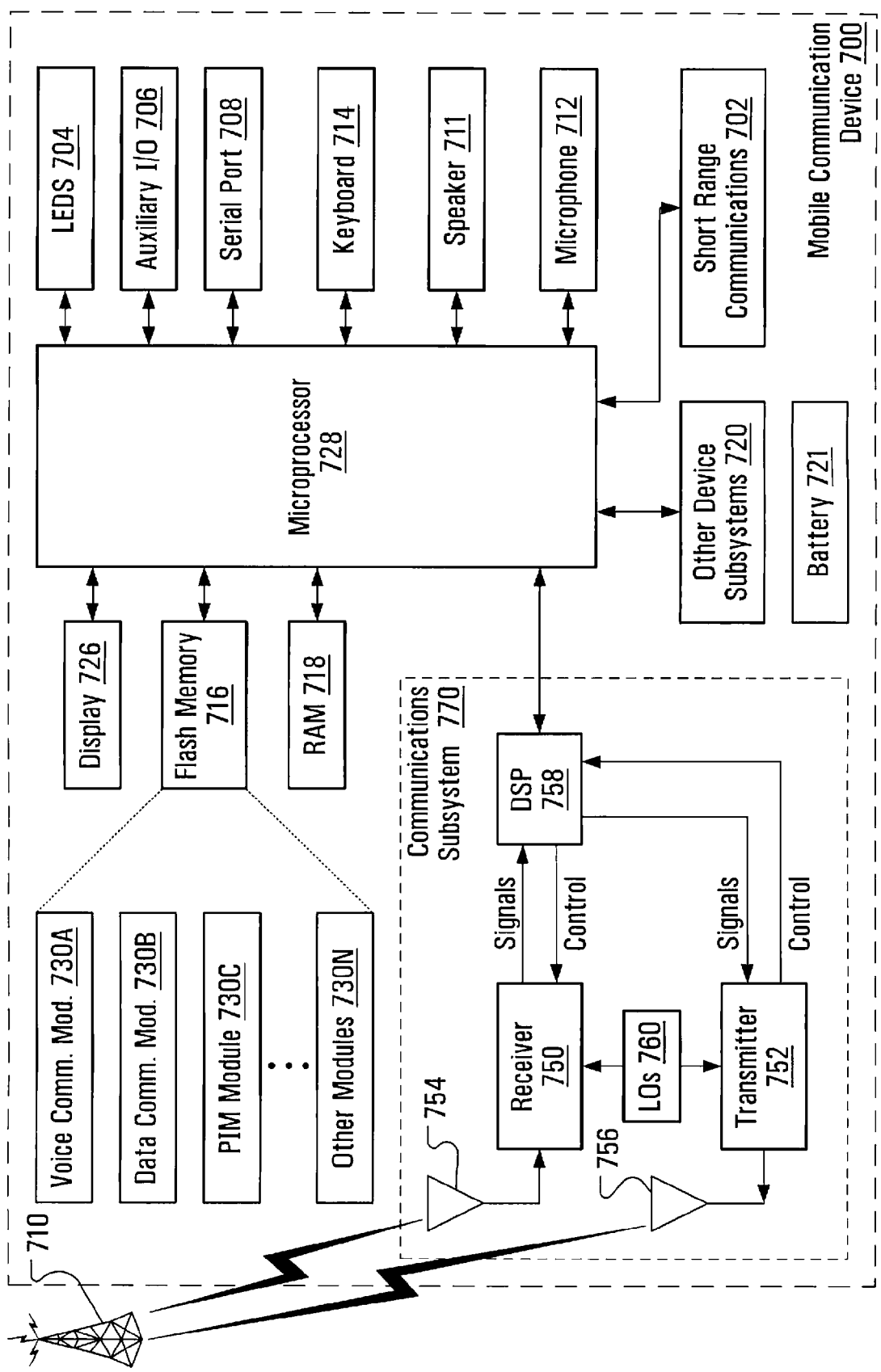
FIG. 7 is a block diagram of an example mobile communication device that may be used to implement methods described herein.

Referring now to FIG. 7, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

A SIP Client User Agent and a SIP Application Manager as described above may be included in a software module stored in memory. Information identifying the mobile device can be stored in the Flash Memory 716 or RAM 718. The information identifying the mobile device is transmitted to the configuration server, as described for example with regard to FIG. 2, via the wireless network 710 using transmitter 752 and antenna 756. Configuration information received from a configuration server for configuring the mobile device as described above is received via the wireless network 710 over the air by antenna 754 and receiver 750. The configuration information may be stored, for example, in the Flash Memory 716 or RAM 718.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the subject matter of the present application may be practised otherwise than as specifically described herein.

The invention claimed is:

1. A method comprising:
    a session initiation protocol (SIP) application on a SIP client that supports multiple SIP applications requesting selection of a SIP application and a SIP feature from a SIP server comprising at least one SIP application, the at least one SIP application comprising at least one SIP feature;
    determining if the requested SIP application and SIP feature are authorized to operate on the SIP client;
    if the requested SIP application and SIP feature are authorized to operate on the SIP client, generating a message comprising a destination address of the SIP server, a source address of the SIP client, a SIP application identifier (ID) for the requested SIP application and a SIP feature identifier (ID) for the requested SIP feature;
    the SIP client transmitting the message.

2. The method of claim 1 wherein generating the message comprises generating one of:
    an INVITE message to start a SIP session between the SIP application of the SIP client and the SIP application identified by the SIP application ID; and
    a NOTIFY message to close out a SIP session between the SIP application of the SIP client and the SIP application identified by the SIP application ID.

3. The method of claim 1, wherein generating a message comprises including the SIP application ID and the SIP feature ID in the message as part of an extension of the destination address.

4. The method of claim 3, wherein the destination address is one of:
    a SIP uniform resource identifier (URI); an email address; a telephone number; a person's name; and any type of identifier that can be translated to an endpoint address.

5. The method of claim 1, wherein the SIP client is a wireless mobile station.

6. The method of claim 1, wherein generating a message further comprises:
    including in the message, an indication to securely identify the SIP client and to allow the SIP client authorized access to the SIP applications that reside on the SIP server, wherein the indication comprises one of:
    a user identification and a password; and
    a shared key or certificate.

7. The method of claim 1, wherein generating a message is based on SIP application configuration information stored on the SIP client.

8. The method of claim 1 further comprising:
    the SIP server receiving the message;
    the SIP server forwarding the message to the SIP application identified by the SIP application ID;
    the SIP application identified by the SIP application ID receiving the message and forwarding the message to the SIP feature identified by the SIP feature ID.

9. A non-transitory computer readable storage medium storing program instructions executable by a processor of a computing device for causing said computing device to perform the steps of the method of claim 1.

10. A method for routing a request for a session initiation protocol (SIP) application and a SIP feature associated with the SIP application, the method comprising:
    a SIP server receiving a message comprising a destination address of the SIP server, a source address of a SIP client which sent the message, a SIP application identifier (ID) associated with the requested SIP application and a SIP feature identifier (ID) associated with the requested SIP feature;
    the SIP server forwarding the message to the SIP application identified by the SIP application ID;
    the SIP application identified by the SIP application ID receiving the message and forwarding the message to the SIP feature identified by the SIP feature ID.

11. A non-transitory computer readable storage medium storing program instructions executable by a processor of a computing device for causing said computing device to perform the steps of the method of claim 10.

12. A method for providing a session initiation protocol (SIP) enabled device with SIP application configuration information, the method comprising:
    the SIP enabled device receiving SIP application configuration information from a configuration server transmitting SIP application configuration information for at least one SIP application, the SIP application configuration information for each SIP application comprising a SIP application identifier (ID) and a list of SIP features associated with the SIP application, each SIP feature of the list of SIP features having a SIP feature identifier (ID);
    the SIP enabled device storing the SIP application configuration information locally.

13. The method of claim 12 further comprising the SIP enabled device transmitting a request for SIP application configuration information.

14. The method of claim 12, wherein the SIP enabled device is a SIP client, the method further comprising:
    using SIP application configuration information stored locally on the SIP client to provision the SIP client to allow access to only SIP applications and SIP features that are defined in the SIP application configuration information.

15. The method of claim 12, wherein the SIP enabled device is a SIP client, the SIP enabled device receiving SIP application configuration information further comprising:

the SIP client receiving at least one of:
: SIP application location information for a SIP server hosting the SIP application; and
: security information to access the SIP server hosting the SIP application.

16. The method of claim 15, wherein receiving security information to access the SIP server hosting the SIP application comprises receiving an indication to securely identify the SIP client and to allow authorization by the configuration server to the SIP application configuration information that resides on the configuration server, wherein the indication comprises one of:
: a user identification and a password; and
: a shared key or certificate.

17. The method of claim 15, further comprising:
: the SIP client accessing locally stored SIP application configuration information for use in selecting, on a SIP server, a SIP application from a plurality of SIP applications and a SIP feature associated with the SIP application.

18. The method of claim 12, wherein the SIP enabled device is a SIP server and receiving SIP application configuration information from a configuration server transmitting SIP application configuration information for at least one SIP application comprises receiving SIP application configuration information for SIP applications hosted by the SIP server.

19. The method of claim 12, wherein transmitting a request further comprises transmitting an indication to securely identify the SIP enabled device and to allow authorized access to applications and features on a different SIP enabled device, wherein the indication comprises one of:
: a user identification and a password; and
: a shared key or certificate.

20. A non-transitory computer readable storage medium storing program instructions executable by a processor of a computing device for causing said computing device to perform the steps of the method of claim 12.

21. A method for configuring a session initiation protocol (SIP) enabled device comprising:
: a configuration server transmitting SIP application configuration information for at least one SIP application, the SIP application configuration information for each SIP application comprising a SIP application identifier (ID) and a list of SIP features associated with the SIP application, each SIP feature of the plurality of SIP features having a SIP feature identifier (ID).

22. The method of claim 21 further comprising:
: the configuration server accessing a memory storage comprising SIP application configuration information for a plurality of SIP applications;
: the configuration server selecting SIP application configuration information specific to the SIP enabled device.

23. The method of claim 22 further comprising:
: the configuration server receiving a request for SIP application configuration information.

24. The method of claim 23 further comprising authenticating the request based on an indication to securely identify the SIP enabled device and allow authorization by the configuration server to the SIP application configuration information that resides on the configuration server, wherein the indication comprises one of:
: a user identification and a password; and
: a shared key or certificate.

25. The method of claim 21, wherein transmitting SIP application configuration information for at least one SIP application further comprises:
: transmitting for the at least one SIP application at least one of:
: SIP application location information for a SIP server hosting the SIP application; and
: security information to access the SIP server hosting the application.

26. The method of claim 21 further comprising storing the SIP application configuration information on the configuration server in an encrypted format.

27. A non-transitory computer readable storage medium storing program instructions executable by a processor of a computing device for causing said computing device to perform the steps of the method of claim 21.

\* \* \* \* \*